(12) United States Patent
Narayanasamy

(10) Patent No.: US 8,177,307 B2
(45) Date of Patent: May 15, 2012

(54) BRAKING CONTROL METHOD AND SYSTEM FOR A POSITIONER IN A MEDICAL IMAGING APPARATUS

(75) Inventor: Rajagopal Narayanasamy, Bangalore (IN)

(73) Assignee: General Electric Company, Schenectady, NY (US)

(*) Notice: Subject to any disclaimer, the term of this patent is extended or adjusted under 35 U.S.C. 154(b) by 832 days.

(21) Appl. No.: 11/240,881

(22) Filed: Sep. 30, 2005

(65) Prior Publication Data

US 2007/0080580 A1    Apr. 12, 2007

(51) Int. Cl.
  *B60T 13/00* (2006.01)
(52) U.S. Cl. ......................................................... 303/20
(58) Field of Classification Search ............ 303/20, 303/122.03, 122.04; 188/161, 163, 164, 188/1.11 E, 158, 171; 378/193–198, 114, 378/117; 361/86, 87
See application file for complete search history.

(56) References Cited

U.S. PATENT DOCUMENTS

| | | | | |
|---|---|---|---|---|
| 5,148,467 A * | 9/1992 | Sato et al. | ...................... | 378/197 |
| 5,155,374 A * | 10/1992 | Shirata et al. | ............... | 290/38 R |
| 5,425,069 A * | 6/1995 | Pellegrino et al. | ............ | 378/198 |
| 6,282,264 B1 * | 8/2001 | Smith et al. | ................... | 378/189 |
| 6,718,927 B2 * | 4/2004 | Goetze et al. | .............. | 123/179.3 |
| 6,989,978 B2 * | 1/2006 | Hiraku et al. | ................... | 361/86 |
| 7,007,779 B2 * | 3/2006 | Johansson et al. | ............ | 188/161 |
| 2003/0090847 A1 * | 5/2003 | Hiraku et al. | ................... | 361/86 |
| 2005/0270720 A1 * | 12/2005 | Johnson, Jr. | ................. | 361/170 |

* cited by examiner

*Primary Examiner* — Robert Siconolfi
*Assistant Examiner* — Vu Q Nguyen
(74) *Attorney, Agent, or Firm* — William Baxter, Esq.; Michael G. Smith, Esq.

(57) ABSTRACT

In some embodiments, a braking system for a positioner in a medical imaging apparatus comprises a brake coil coupled to a power supply, a first control circuit coupled to a top side of the brake coil, a second control circuit coupled to a bottom side of the brake coil, and a current sensor coupled to at least one of the first control circuit and the second control circuit.

3 Claims, 5 Drawing Sheets

BRAKING CONTROL METHOD AND SYSTEM FOR A POSITIONER IN A MEDICAL IMAGING APPARATUS

RELATED APPLICATION

This application is related to copending U.S. application Ser. No. 11/241,076, filed Sep. 29, 2005 entitled "SYSTEMS, METHODS AND APPARATUS FOR POWERED ASSISTANCE OF A MOTORIZED SUPPORT DEVICE."

FIELD OF THE INVENTION

This invention relates generally to methods and systems for braking control, and more particularly to, a safe braking control method and system for a positioner in a medical imaging apparatus.

BACKGROUND OF THE INVENTION

Typically, in a medical imaging apparatus, a positioner is configured motorized for movement along various positioner axes for carrying out patient positioning and medical imaging. An electro-mechanical brake is coupled to the positioner, for holding the positioner against influence of gravity during power OFF state of the medical imaging apparatus or during an emergency situation. A control circuit comprising an electromagnetic relay, a MOSFET or a transistor device is coupled to the electro-mechanical brake. During power ON state of the medical imaging apparatus, the control circuit controls the power supplied to the electro-mechanical brake and thereby controls movement of the positioner for patient positioning and medical imaging.

Examples of a medical imaging apparatus include an X-ray apparatus, a CT scanner, a vascular imaging apparatus, etc. Examples of a positioner include a patient table, a vascular gantry comprising a C arm and a pivot axis, etc. Examples of positioner axes include lift axis, pivot, longitudinal and tilt axes.

However, with the above method and system of braking, in circumstances such as, a failure in the control circuit, especially due to an over current, a short circuit or an over voltage, the power supply to the electro-mechanical brake is not controlled. The electro-mechanical brake is likely to receive continuous power supply that may result in uncontrolled movement of the positioner especially due to influence of gravity. This uncontrolled movement of the positioner due to influence of gravity may cause shock, injury or fall of the patient from the positioner, leading to unsafe patient positioning and medical imaging.

Thus, there exists a need for a safe braking control method and system wherein the system provides for a safe and efficient braking that would not cause uncontrolled motion of the positioner due to influence of gravity, especially in circumstances such as, for example, short circuit, over current or an over voltage in the control circuit.

SUMMARY OF THE INVENTION

The above-mentioned shortcomings, disadvantages and problems are addressed herein which will be understood by reading and understanding the following specification.

In an embodiment, a braking system for a positioner is provided. Accordingly, the braking system comprises a brake coil coupled to a power supply, a first control circuit coupled to a top side of the brake coil, a second control circuit coupled to a bottom side of the brake coil, and a current sensor coupled to at least one of the first control circuit and the second control circuit.

In another embodiment, a brake release control method for a positioner is provided. Accordingly, the brake release control method comprises the actions of (i) enabling the first control circuit; (ii) measuring the brake current, (iii) enabling the second control circuit if the brake current of action (ii) is less than a predetermined switching magnitude, (iv) measuring the brake current, (v) confirming brake release if the brake current of action (iv) is more than or equal to the switching magnitude.

In yet another embodiment, a brake application control method for a positioner is provided. The method comprises the actions of (i) disabling the first control circuit, (ii) measuring the brake current, (iii) disabling second control circuit if the measured brake current is less than a predetermined switching magnitude, (iv) measuring brake current, (v) confirming brake application if the output of action (iv) is less than a predetermined switching magnitude.

Systems and methods of varying scope are described herein. In addition to the aspects and advantages described in this summary, further aspects and advantages will become apparent by reference to the drawings and with reference to the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Various embodiments of this invention provide a braking method and system for a positioner in a medical imaging apparatus. However, the embodiments are not limited and may be implemented in connection with other imaging apparatus such as, for example, industrial imaging apparatus, security scanners, etc.

In various embodiments, the braking system according to this invention comprises a brake coil coupled to a power supply, a first control circuit coupled to a top side of the brake coil, a second control circuit coupled to a bottom side of the brake coil, and a current sensor coupled to at least one of the first control circuit and the second control circuit.

Figure 1:
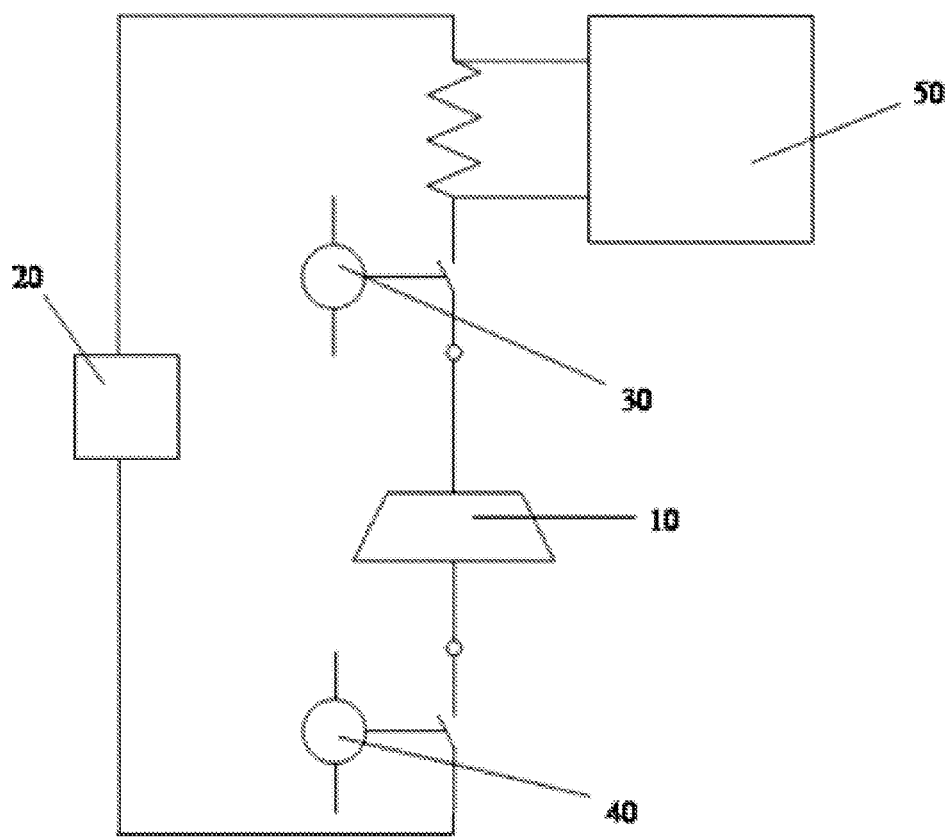
FIG. 1 shows a circuit diagram of an example of a braking system according to one embodiment.

FIG. 1 shows a circuit diagram of an example of a braking system 100 according to one embodiment. The braking system 100 comprises a brake coil 10 coupled to a power supply 20. A first control circuit 30 is coupled to a top side of the brake coil 10. A second control circuit 40 is coupled to a bottom side of the brake coil 10. A current sensor 50 is coupled to the first control circuit 30.

The brake coil 10 is coupled to a positioner axis (not shown). The first control circuit 30 is configured to control the power supplied to the brake coil 10. The second control circuit 40 is configured in series to the first control circuit 30 to control the power supplied to the brake coil 10. Brake release or apply operation on the positioner axis is dependent on the power supplied to the brake coil.

In an example, the brake coil 10 comprises an electrically operated solenoid. The power supply 20 may include either an ac or a dc power supply. The positioner axis includes at least one of a lift axis, pivot, a longitudinal axis, and a tilt axis.

In the description herein, top side refers to the upper side of the brake coil 10 and the bottom side refers to the lower side of the brake coil 10. The current sensor 50 is coupled to the first control circuit 30 so as to facilitate early stage current measurement and also simultaneous monitoring of both the first control circuit 30 and the second control circuit 40. However, an embodiment wherein the current sensor 50 is coupled to the second control circuit 40 is also possible.

It should also be noted that configuring the current sensor 50 at the top side is advantageous because the positioner axis with faulty brake control can be disconnected and allow other positioner axis to function.

In an embodiment, the first control circuit 30 comprises a known arrangement (not shown) such as, for example, a switching device coupled to a control device. The control device is configured for controlling the switching device so as to regulate the power supplied to the brake coil 10. Examples of the switching device include a relay, a MOSFET, a transistor, etc. Examples of the control device include a microprocessor, a Field Programmable Gate Array (FPGA), etc. The second control circuit 40 comprises a substantially similar configuration as that of the first control circuit. However, other embodiments, wherein the second control circuit 40 is configured different from the first control circuit 30, to regulate the power supplied to the brake coil, is also possible.

It should be noted that during normal circumstances, the first control circuit 30 and the second control circuit 40 are configured to collectively control the power supplied to the brake coil 10. However in the event of a failure e.g. a single point failure of the first control circuit 30, the second control circuit 40 is configured to supplement the function of the first control circuit 30, and vice versa.

Figure 2:
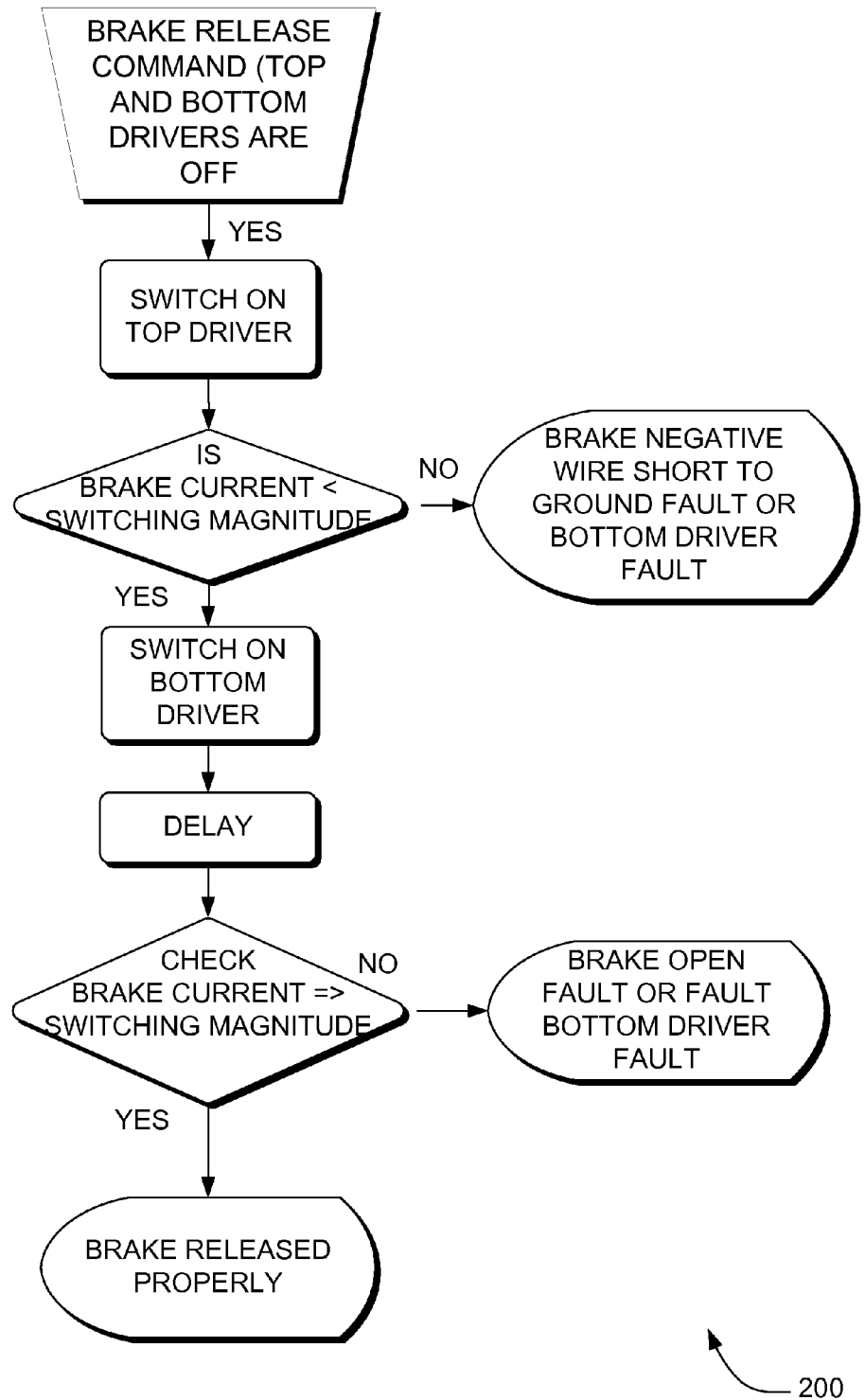
FIG. 2 shows a flow chart of a brake release control method according to some embodiment.

FIG. 2 shows an example of a flow chart of a method 200 for brake release operation control of a positioner axis. In normal state, the first control circuit 30 and second control circuit 40 are in disabled state i.e. switched OFF. In the embodiment shown, the brake release control method 200 includes enabling i.e. switching ON the first control circuit 30 and measuring the brake current i.e., the current through the brake coil 10. If the brake current is less than a predetermined switching magnitude, then the second control circuit 40 is enabled i.e. switched ON. If brake current is more than or equal to the switching magnitude, then an alarm indicating fault in the second control circuit 40 is issued. For example, the fault may be due to shorting of one of brake wires (not shown) to ground or mutual shorting of brake wires. The alarm may be issued in the form of a display readable by user.

It should be noted that for brake release, the switching magnitude is defined as the minimum current required for activating the brake coil 10 for brake release operation.

After enabling the second control circuit 40, a time delay for example, in the range of about 75 to 150 milliseconds is introduced for building up of the brake current within the brake coil 10. After the delay, the brake current is measured. If the brake current is more than or equal to the switching magnitude, the brake release operation is confirmed. If the brake current is less than the switching magnitude, then an alarm indicating a fault in the second control circuit is issued. For example, the fault may be due to an open circuit, and the alarm may be in the form of a display.

Figure 3:
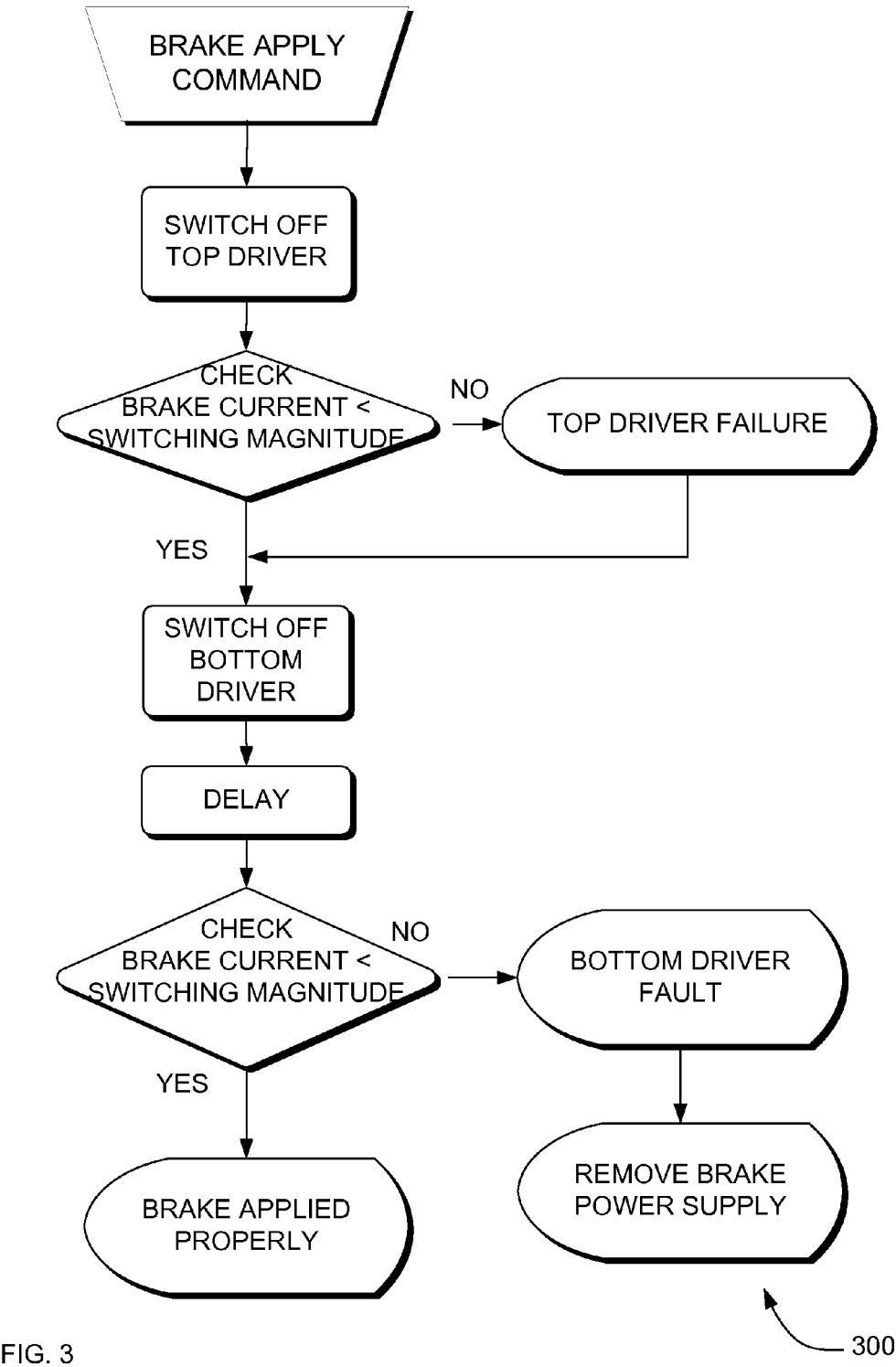
FIG. 3 shows a flow chart of a brake application control method according to some embodiment.

FIG. 3 shows a flow chart depicting an example of a brake application control method 300 for a positioner according to this invention. Accordingly, the method 300 includes disabling i.e. switching OFF the first control circuit 30 and measuring the brake current. If the brake current is less than a predetermined switching magnitude, then the second control circuit 40 is disabled i.e. switched OFF. If the brake current is equal to or more than the switching magnitude, then an alarm indicating failure in the first control circuit 30 is issued. For example, the alarm may be issued in the form of a display readable by the user.

After disabling the first control circuit 30, a delay for example for a period of about 75 to 125 milliseconds may be introduced for building up of the brake current in the brake coil 10. After the delay, the brake current is measured. If the brake current is less than the switching magnitude, then the brake application is confirmed. If the brake current is equal to or more than the switching limit, then an alarm indicating a fault in the second control circuit 40 is issued. For example, the alarm may be issued in the form of a display readable by the user.

It should be noted that in an embodiment of the brake application control method 300, the switching magnitude is defined as the maximum current required to activate the brake coil for brake applying operation.

Thus, in the embodiments described above, feedback from the current sensor 50 is used to identify failure in the first control circuit 30 and the second control circuit 40. Since both the first control circuit 30 and the second control circuit 40 is required to be enabled or disabled in sequence respectively for brake release and brake apply operations, problems arising due to single point failure of first control circuit 30 or the second control circuit 40 is avoided.

The braking system according to this invention improves patient safety by proactively detecting the failure occurring in either the first control circuit 30 or the second control circuit 40, and thereby prevents uncontrolled motion of the positioner axis due to such failure. Patient safety is improved because at least one of the first control circuit 30 and the second control circuit 40 is made available for operating the brake coil 10 and hence bring the patient to safe position in the event of a single point failure in any one of the first control circuit 30 and the second control circuit 40.

Thus, various specific embodiments of this invention provide a braking method and system for a positioner in a medical imaging apparatus. While the invention has been descried with various specific embodiments, it will be possible for a person skilled in the art to practice the invention with modifications. However, all modifications are deemed to be within the scope of the claims.

Figure 4:
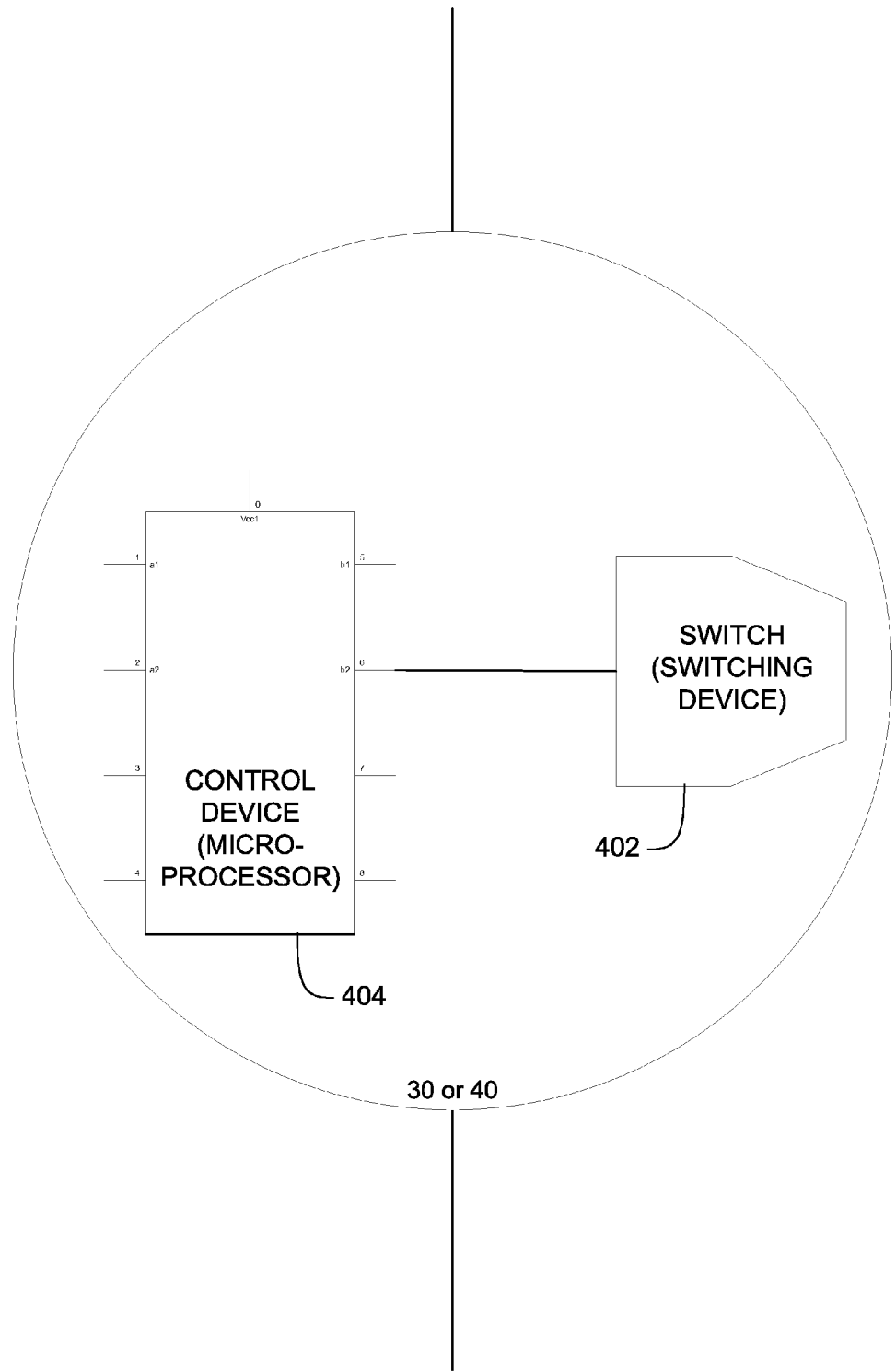
FIG. 4 shows a first control circuit or a second control circuit that comprises a switching device coupled to a control device.

FIG. 4 shows the first control circuit 30 or a second control circuit 40 that comprises a switching device 402 coupled to a control device 404.

Figure 5:
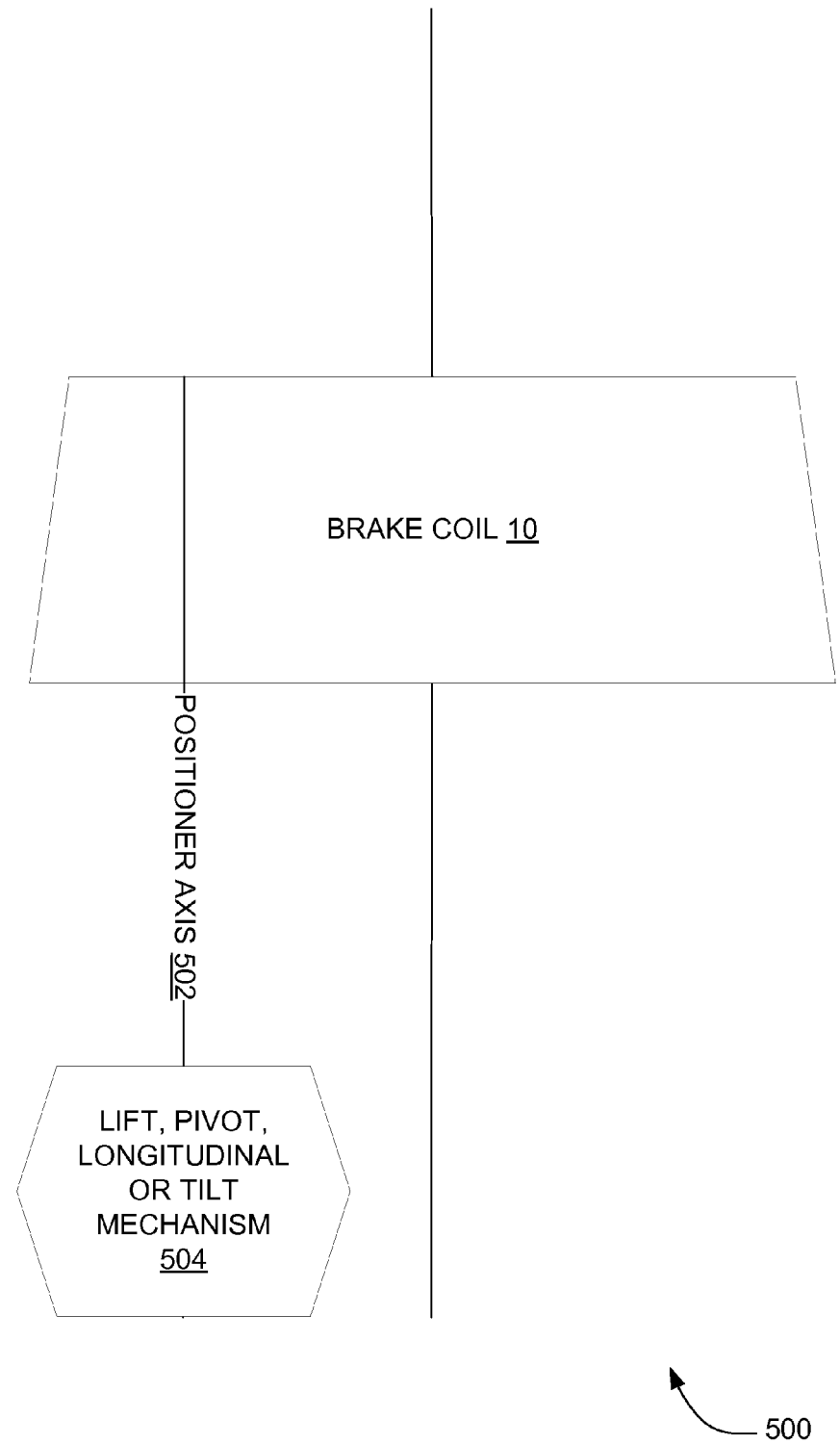
FIG. 5 shows a braking system that includes a positioner axis coupled to a brake coil.

FIG. 5 shows a braking system 500 that includes a positioner axis 502 coupled to a brake coil 10. The positioner axis 502 includes at least one of a lift axis, pivot, a longitudinal axis, and a tilt axis. The braking system 500 also includes at least one of a lift, pivot, longitudinal and tilt mechanism 504 configured with the positioner axis.

What is claimed is:

1. A braking system for a positioner of a medical imaging apparatus, the braking system comprising:
 a brake coil of the positioner coupled to a power supply of the medical imaging apparatus;
 a first control circuit of the positioner coupled to a top side of the brake coil of the positioner,
  wherein the first control circuit of the positioner is configured to control the power supplied to the brake coil of the positioner,
  wherein the first control circuit of the positioner is coupled to a first side of the power supply of the medical imaging apparatus,
  wherein the first control circuit includes at least one control device and at least one switching device that enables the first control circuit, that disables the first control circuit, and that issues an alarm indicative of first control circuit failure;
 a second control circuit of the positioner coupled to a bottom side of the brake coil of the positioner,
  wherein the second control circuit of the positioner is configured in series to the first control circuit of the positioner to control the power supplied to the brake coil of the positioner,
  wherein the second control circuit of the positioner is coupled to a second side of the power supply of the medical imaging apparatus,
  wherein the second control circuit includes at least one control device and at least one switching device that enables the second control circuit if the brake current of a first measuring is less than a minimum current required to activate the brake coil for brake release operation, that disables the second control circuit if a first measuring of the brake current is less than a maximum current required to activate the brake coil for brake apply operation, that confirms brake release if a second measuring of the brake current is more than or equal to the minimum current required to activate the brake coil for brake release operation and that issues an alarm indicative of a fault in the second control circuit if the second measuring of brake current is less than the minimum current required to activate the brake coil for brake release operation; and
 a current sensor of the positioner coupled to at least one of the first control circuit of the positioner and the second control circuit of the positioner,
 wherein the first control circuit is configured to supplement the function of the second control circuit in the event of a single point failure of the second control circuit,
 wherein the second control circuit is configured to supplement the function of the first control circuit in the event of a single point failure of the first control circuit,
 wherein the first control circuit and the second control circuit are enabled or disabled in sequence respectively for brake release and brake apply operations.

2. The braking system according to claim 1 further comprising:
 a positioner axis coupled to the brake coil.

3. The braking system according to claim 2 further comprising:
 at least one of a lift, pivot, longitudinal and tilt mechanism configured with the positioner axis.

* * * * *